United States Patent
Leonard

(10) Patent No.: US 6,691,989 B1
(45) Date of Patent: Feb. 17, 2004

(54) VARIABLE RATE AIR SPRING ASSEMBLY

(75) Inventor: John R. Leonard, Arcardia, IN (US)

(73) Assignee: BFS Diversified Products, LLC, Carmel, IN (US)

( * ) Notice: Subject to any disclaimer, the term of this patent is extended or adjusted under 35 U.S.C. 154(b) by 0 days.

(21) Appl. No.: 10/222,711

(22) Filed: Aug. 16, 2002

(51) Int. Cl.[7] .................................................. F16F 9/43
(52) U.S. Cl. ............................... 267/64.28; 267/64.23; 267/64.19; 267/35; 267/118; 267/122
(58) Field of Search .......................... 267/64.24, 64.23, 267/64.19, 64.21, 64.27, 64.28, 35, 118, 122; 411/81, 337, 355, 378, 381, 382

(56) References Cited

U.S. PATENT DOCUMENTS

| | | | |
|---|---|---|---|
| 2,773,686 A | * 12/1956 | Nash ....................... | 267/64.23 |
| 2,930,607 A | 3/1960 | Hutzenlaub | |
| 2,999,682 A | * 9/1961 | Stump ..................... | 267/64.23 |
| 3,039,761 A | 6/1962 | Van Zijp | |
| 3,212,769 A | * 10/1965 | Ishibashi et al. ......... | 267/64.23 |
| 3,870,286 A | * 3/1975 | Willich ................... | 267/64.24 |
| 4,401,298 A | * 8/1983 | Eaton et al. ........... | 267/140.13 |
| 4,410,006 A | * 10/1983 | Moulton ................. | 137/493.8 |
| 5,118,236 A | * 6/1992 | Rodriguez et al. .......... | 411/378 |
| 5,169,129 A | 12/1992 | Hoffman | |
| 5,193,788 A | * 3/1993 | Richter et al. ............. | 267/227 |
| 5,234,203 A | * 8/1993 | Smith ........................ | 267/131 |
| 5,413,316 A | 5/1995 | Easter | |
| 5,954,316 A | * 9/1999 | Voss ........................ | 267/64.27 |
| 6,202,388 B1 | * 3/2001 | Sanfilippo et al. ............ | 53/432 |
| 6,561,500 B2 | * 5/2003 | Schisler et al. .......... | 267/64.27 |

* cited by examiner

*Primary Examiner*—Christopher P. Schwartz
*Assistant Examiner*—Devon Kramer
(74) *Attorney, Agent, or Firm*—Michael Sand; Michael R. Huber

(57) ABSTRACT

An air spring assembly has a pair of spaced end plates and a flexible sleeve extending therebetween forming an internal fluid chamber. One of the end plates is a bead plate which is crimped to an open end of the sleeve. An insert having an internally threaded hole is mounted in a central hole formed in the bead plate. An externally threaded coupler having a hollow bore is mounted in a central opening formed in an end member of an auxiliary reservoir and is threadably engaged with the internally threaded hole to mount the auxiliary reservoir in an abutting relationship on the air spring bead plate to provide a variable rate air spring. A fluid path is provided through the threaded connection for the flow of fluid between the air spring and auxiliary reservoir.

23 Claims, 6 Drawing Sheets

VARIABLE RATE AIR SPRING ASSEMBLY

BACKGROUND OF THE INVENTION

1. Technical Field

The invention relates to air spring assemblies for vehicle suspensions, and in particular to an air spring having an auxiliary reservoir interchangeably mounted thereon to provide a variable spring rate to the air spring by increasing the total volume of the pressurized fluid by the auxiliary reservoir chamber.

2. Background Information

Air spring assemblies typically include two end plates or bead plates, or one end plate and a piston, which are sealingly connected to respective ends of a hollow fabric reinforced rubber sleeve or bladder. These air springs are used primarily for implementation in motor vehicles for supporting the vehicle body or for use in other types of equipment subject to shock to provide cushioning therefor. The air springs are sealed at the ends to form a pressurized fluid chamber within the bladder. The air spring will generate a certain load at a given height and pressure, and upon the air spring experiencing a road displacement input, the sleeve will begin to collapse or extend as the end members move toward or away from each other respectively, to yield predictable dynamic load characteristics.

These dynamic load characteristics of the air spring are a function of the internal air pressure, volume and effective area. One of the factors which determines the spring rate is the volume of air contained within the flexible sleeve or bladder of the air spring. Varying this volume of air enables various spring rates to be achieved. This is presently accomplished by various means such as by supplying or removing air into or from the air spring chamber through various control valves and by the use of auxiliary air reservoirs which are fluidly connected to the vehicle air spring. Thus changing the spring rate of an existing air spring enables the same air spring to provide certain desired characteristics for the vehicle. The smaller the volume of the air chamber the firmer will be the ride provided thereby.

Heretofore auxiliary reservoirs for air springs usually consisted of a remotely mounted reservoir, which was connected by a hose or other fluid communication lines to the air chamber of the air spring. These remotely located reservoirs generally contained various means for adjusting the volume of the air within the air chamber. These auxiliary reservoirs are located remote from the air spring and are not formed as an integral part thereof, and the size and length of the connecting fluid lines often retard the air flow reducing the effectiveness of the change of volume. Other types of auxiliary reservoirs are connected to an existing air spring by complicated control valves, which could be subject to maintenance problems.

Often it is desirable to tailor the dynamic load characteristics of the air spring to fit a particular vehicle or application. However, it is not always practical to change the bladder size of the air spring for all applications and some vehicles have certain space limitations which do not allow for a larger bladder size and have restrictions on the height and width of the air spring.

BRIEF SUMMARY OF THE INVENTION

What the art needs is an air spring assembly which allows for control of its overall effective air chamber volume in order to achieve certain dynamic load characteristics without having to change the physical side of the bladder of the existing air spring by selectively adding an auxiliary reservoir to the air spring, wherein the air chamber of the auxiliary reservoir is fluidly connected with the internal chamber of the air spring.

Another aspect of the invention is to provide an annular elastomeric seal surrounding a fluid passage between the auxiliary reservoir and air spring chamber which is located between an outer surface of the bead plate and end wall of auxiliary reservoir, which components are in abutting contact, to provide an air seal to prevent the escape of air from the internal chambers.

Still another aspect of the invention is to use the existing bead plate of the air spring which is modified by forming an enlarged central opening, in which an internally threaded insert is secured for threadably receiving an externally threaded coupler extending outwardly from an end wall of the auxiliary air chamber. This enables the auxiliary air chamber to be threadably engaged and secured on the bead plate of the existing air spring wherein the auxiliary reservoir can have various bladder sizes, axial lengths and configurations depending upon the particular application in which the combination air spring and auxiliary reservoir is adapted for use.

A further feature of the invention is by having an auxiliary reservoir directly mounted on the air spring end plate, it enables a small volume air spring to be used in an environment where larger diameter air springs with already low spring rates, would be prohibited.

Another advantage of the air spring assembly of the present invention is that the auxiliary reservoir can be interchangeable as to height and diameter, but maintain a large diameter common orifice extending between the auxiliary reservoir and air spring with a relatively short fluid path therebetween, to allow for the rapid transfer of large volumes of air between the air chambers.

The air spring assembly of the present invention enables existing bead plates to be utilized wherein an enlarged opening is formed in the center of the bead plate and an internally threaded insert is secured by brazing, welding or other securement means, with the auxiliary reservoir, regardless of its size and configuration, all having an externally threaded male coupler which screws into the air spring and seats against an outer O-ring located in an annular groove formed in the insert of the air spring, to provide for an airtight and compact air spring assembly.

Still another feature of the invention is to enable the end wall of the auxiliary reservoir which is located opposite of the end wall having the externally threaded coupler, to have the same mounting stud and air duct inlet opening arrangement as heretofore formed in the end member of the air spring enabling the auxiliary reservoir to be secured in and to the existing mounting holes and/or brackets on the vehicle as was the existing end member of the air spring, eliminating any modifications to the vehicle on which the combination auxiliary reservoir and air spring is mounted.

The foregoing advantages, construction and operation of the present invention will become more readily apparent from the following description and the accompanying drawings.

BRIEF DESCRIPTION OF THE SEVERAL VIEWS OF THE DRAWINGS

Similar numerals refer to similar parts throughout the drawings.

DETAILED DESCRIPTION OF THE INVENTION

Figure 1:
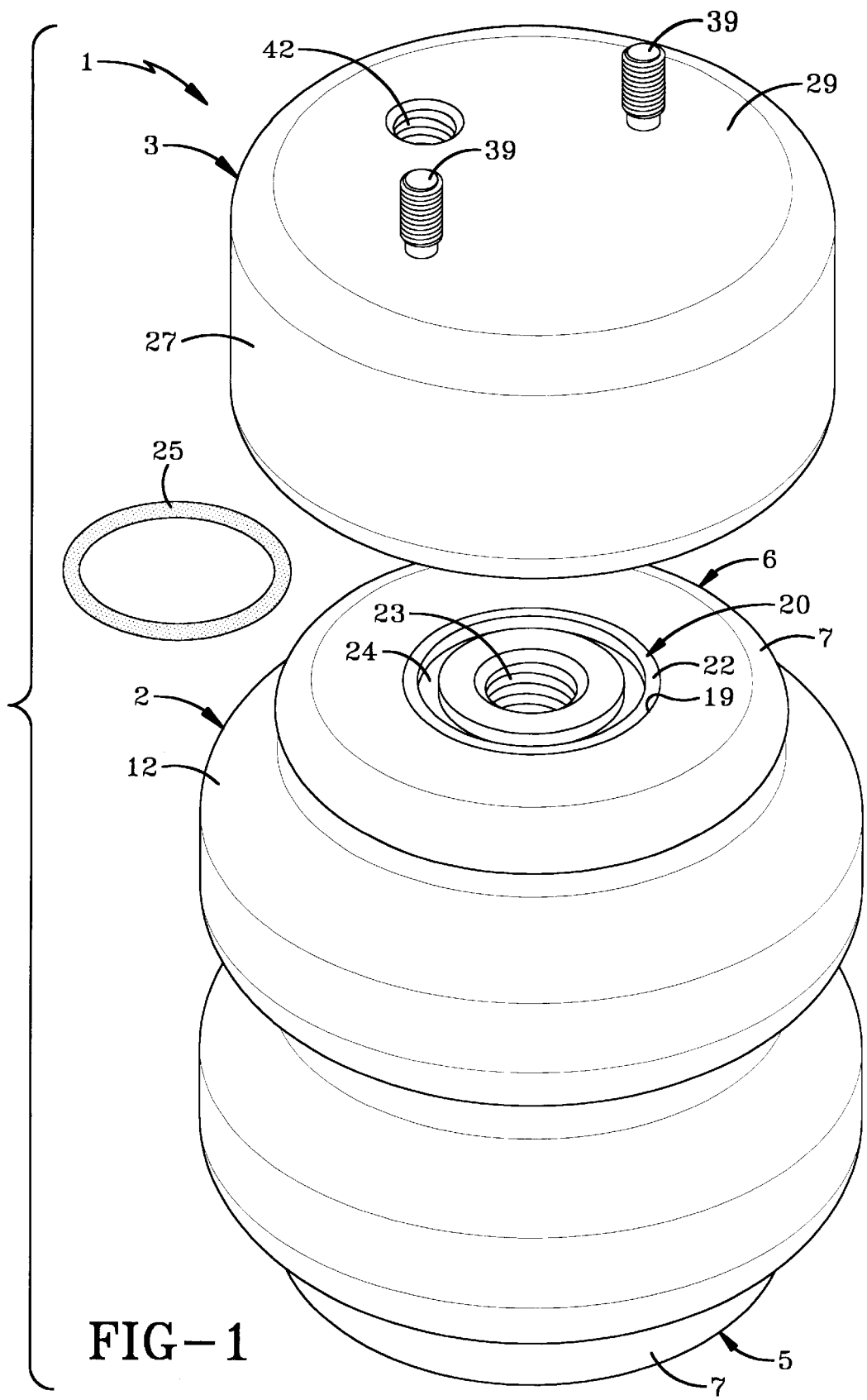
FIG. 1 is an exploded perspective view of a first embodiment of the variable rate air spring assembly of the present invention.
Figure 2:
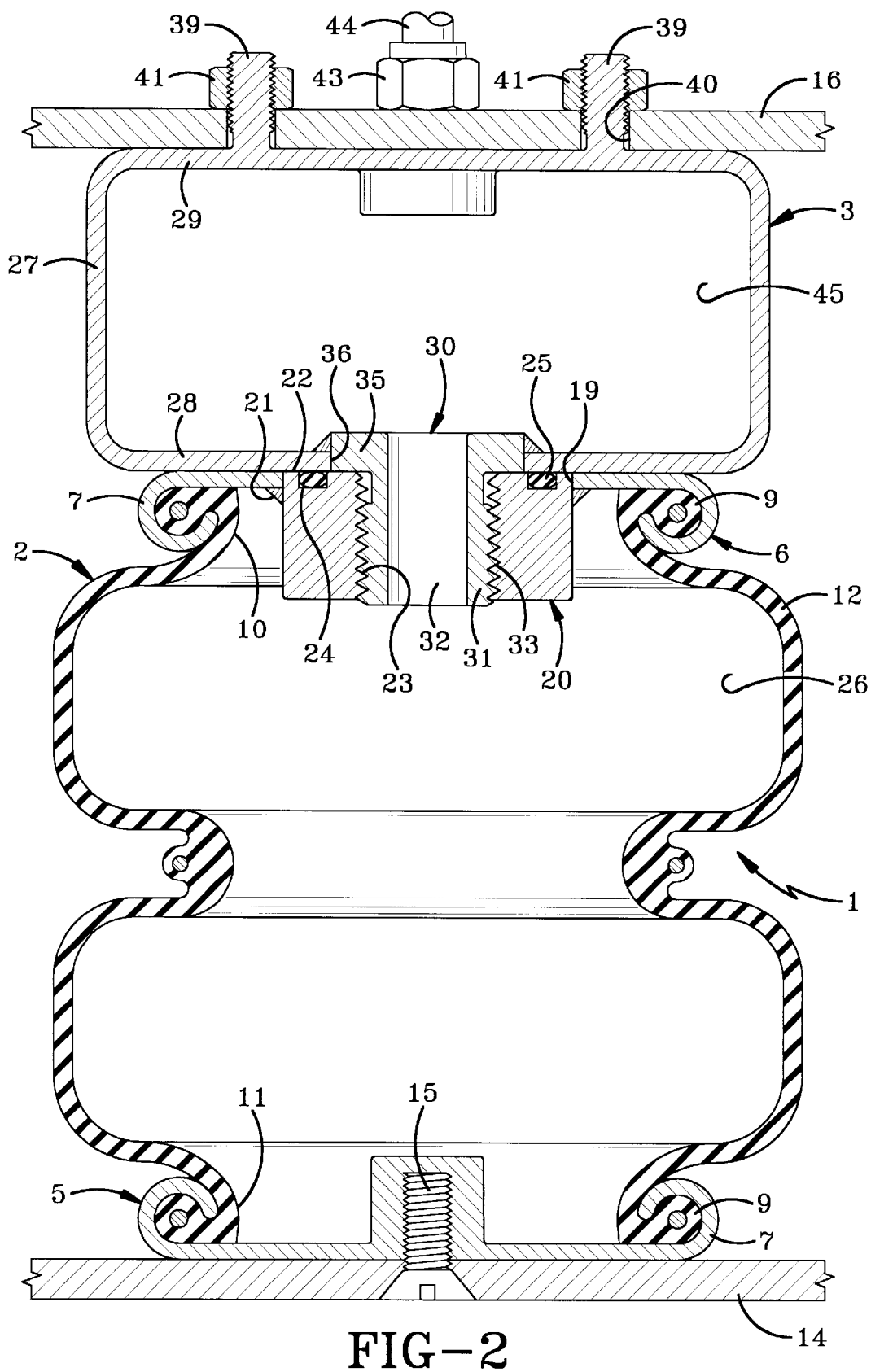
FIG. 2 is a sectional view of a first embodiment of an auxiliary reservoir mounted on the air spring, which assembly is mounted between spaced supporting structures.
Figure 3:
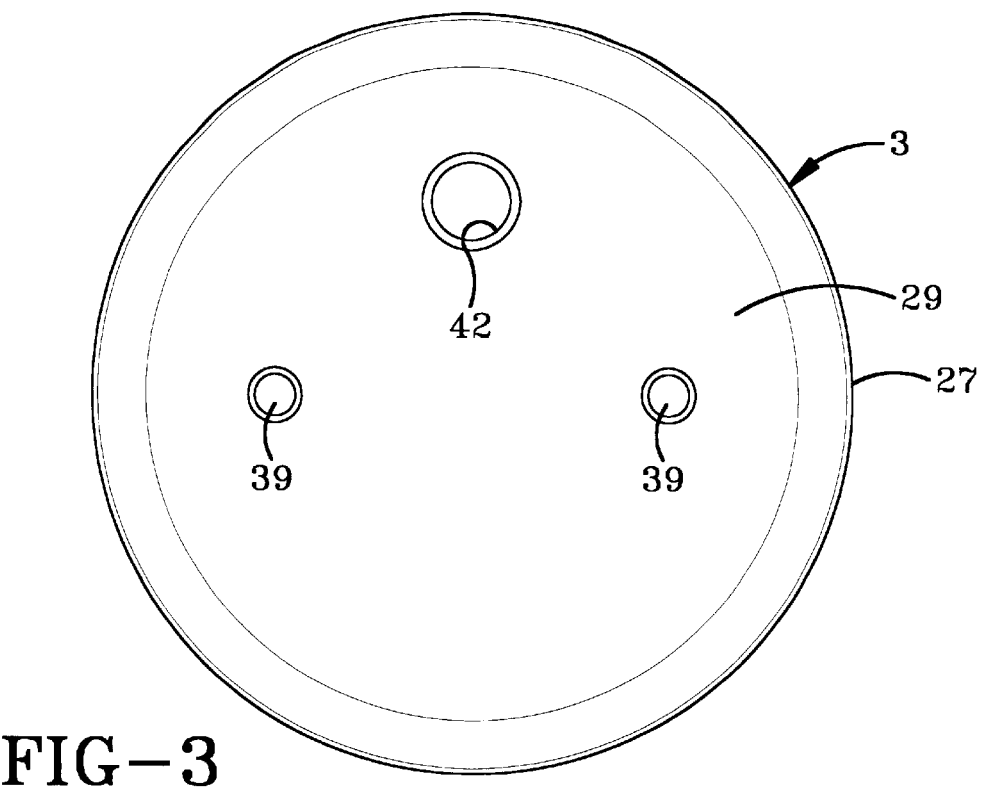
FIG. 3 is a top plan view of the auxiliary reservoir of FIG. 2.
Figure 4:
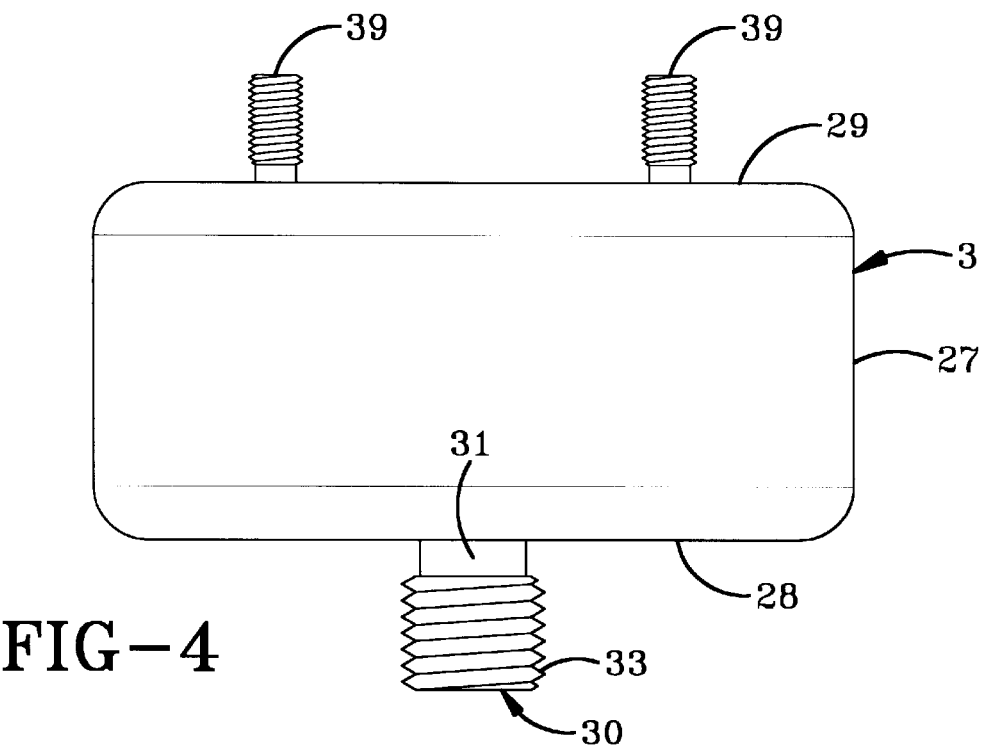
FIG. 4 is a side elevational view of the auxiliary reservoir of FIG. 3.
Figure 5:
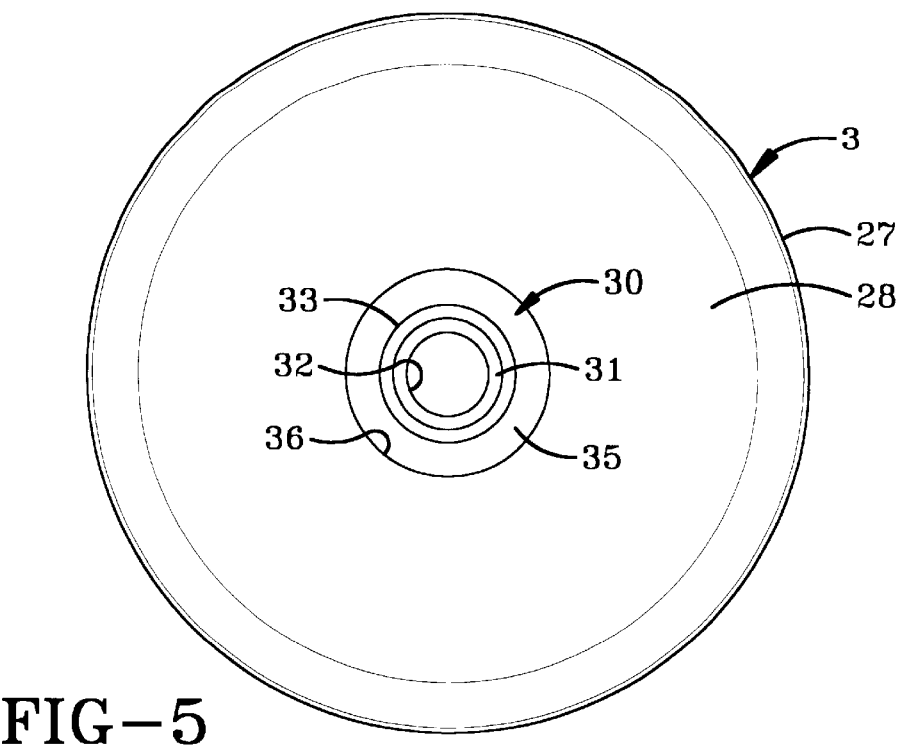
FIG. 5 is a bottom plan view of FIG. 4.
Figure 6:
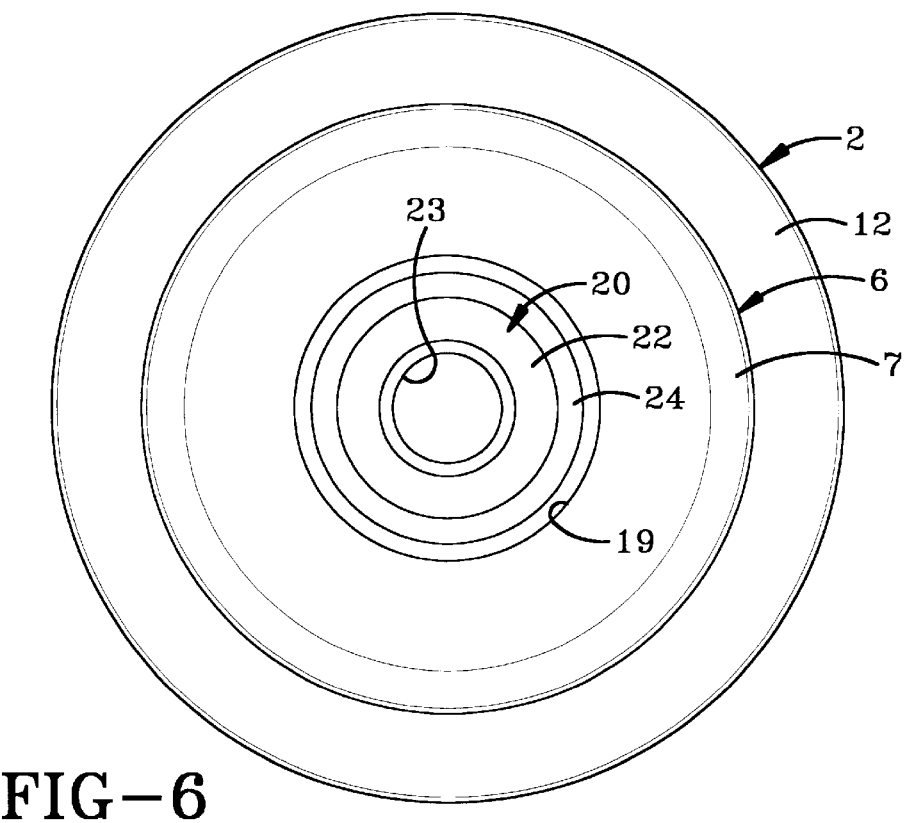
FIG. 6 is a top plan view of the air spring of FIG. 1 before mounting the auxiliary reservoir thereon.

A first embodiment of the air spring assembly of the present invention is indicated generally at 1 and shown in FIGS. 1–6. Assembly 1 includes a usual convoluted air spring 2 and an auxiliary reservoir 3. Air spring 2 includes a pair of end members 5 and 6 which as shown in FIGS. 2 and 3, are disc-shaped bead plates having rolled peripheral ends 7 which are sealingly clamped to enlarged bead areas 9 defining a pair of opposed open ends 10 and 11 of a flexible elastomeric sleeve or bladder 12. Sleeve 12 preferably is formed of an elastomeric material which usually includes fabric cords embedded therein to strengthen the sleeve and restrict the inflated diameter as the sleeve is expanded and compressed during operation of the air spring. In many air springs, bottom end member 5 will be a piston having a contoured sidewall along which the air spring will move to provide various spring rate characteristics as the air spring moves towards a compressed position. End member 5 will be secured to a vehicle component 14 by a fastener 15 or other attachment means.

Auxiliary reservoir 3 will be attached to an upper support structure 16, such as a vehicle chassis and/or vehicle axis or other device where cushioning is desired between two spaced members, such as represented by members 14 and 16 and shown particularly in FIG. 2.

In accordance with one of the features of the invention, bead end plate 6 is formed with a central opening 19 (FIG. 2) in which an annular insert 20 is secured by brazing, welds 21, or other type of securement. Insert 20 has a internally threaded hole 23 extending therethrough and is formed with an annular groove 24 in an outer surface 22 in which is seated an annular elastomeric O-ring 25. Insert 20 projects into the fluid pressure chamber 26 formed in the interior of sleeve 12.

Auxiliary reservoir 3 is a rigid annular canister formed of metal or high strength plastic having a cylindrical sidewall 27 and bottom and top disc-shaped end walls 28 and 29.

In accordance with another feature of the invention, a coupler indicated generally at 30, which is generally T-shaped in cross section as shown in FIG. 2, has a cylindrical leg 31 formed with a hollow interior 32 and external threads 33, and a disc-shaped stem 35, is secured within an enlarged opening 36 formed in end wall 28. Top end wall 29 of auxiliary reservoir 3 is formed with a pair of mounting studs 39 which extends through holes 40 formed in vehicle component 16 where they are engaged by nuts 41 to rigidly mount auxiliary reservoir 3 onto the vehicle component. A usual fluid inlet opening 42 is formed in end wall 29 (FIG. 3) and receives a coupler 43 to which is connected a fluid line 44 for admitting and exhausting fluid into and out of auxiliary reservoir interior chamber 45 and subsequently air spring fluid chamber 26. Threaded studs 39 and fluid opening 42 preferably have the same spacing and pattern as does a usual bead plate of an air spring similar to end member 6 for attaching the air spring to a vehicle structure. This avoids any modification of the mounting arrangement and hole pattern or brackets used on vehicle structure 16, thus facilitating mounting of air spring assembly 1 between spaced vehicle components 14 and 16.

In accordance with one of the main features of the invention, auxiliary reservoir 3 is easily mounted on air spring 2 to form a compact structure by spin mounting reservoir 3 onto and into abutting engagement with bead plate 6 by the threaded engagement of coupler 30 with annular insert 20 (FIG. 2). Thus auxiliary reservoir 3 is spun onto insert 20 until bottom wall 28 is clamped tightly against bead plate 6 and is in sealing compression with O-ring 25 to prevent the escape of the pressurized fluid, which will usually be air, from chambers 26 and 45. Thus various sizes and configurations of auxiliary reservoir 3 can be easily mounted to air spring 2 by the threaded engagement of externally threaded coupler 30 with internally threaded insert 20. The abutting engagement between end plate 6 and end wall 28 will provide a compact assembly adaptable for use in limited space. The internal and external threads of these two members can be coarse threads if desired since O-ring 25 can provide the air seal between auxiliary reservoir 3 and air spring 2 instead of relying upon the threaded connection therebetween. Furthermore, internal bore 32 of coupler 30 provides the fluid path between fluid chambers 26 and 45 and can be formed sufficiently large to provide for the rapid flow of fluid between the air chambers throughout the relatively short linear length of bore 32 as opposed to the longer piping and tubes used in prior art auxiliary reservoirs.

This mounting arrangement of auxiliary reservoir 3 on air spring 2 enables existing air springs having a usual bead plate 6 (as shown in FIGS. 1–2 and 5–6) to be adapted for various types of air springs simply by forming central opening 19 in bead plate 6, such as by a metal punch or similar metal forming operation, afterwhich insert 20 is secured therein by welding, brazing, etc. Various configurations of auxiliary reservoir 3 then are readily mounted on plate 6 by providing the bottom wall or end plate of the auxiliary reservoir with externally threaded coupler 30, which is then merely spin tightened into insert 20. This enables existing bead plates 6 to be utilized without effecting the manner of attachment of the air spring open end thereto. End member 6, which is shown and described as being a bead plate, could have other types of sealing arrangements with the open end of sleeve 12, such as by use of a swage or clamp ring which clamps the open end of the sleeve against a clamping area extending from the disc-shaped peripheral portion of end member 6 without effecting the concept of the invention.

Figure 7:
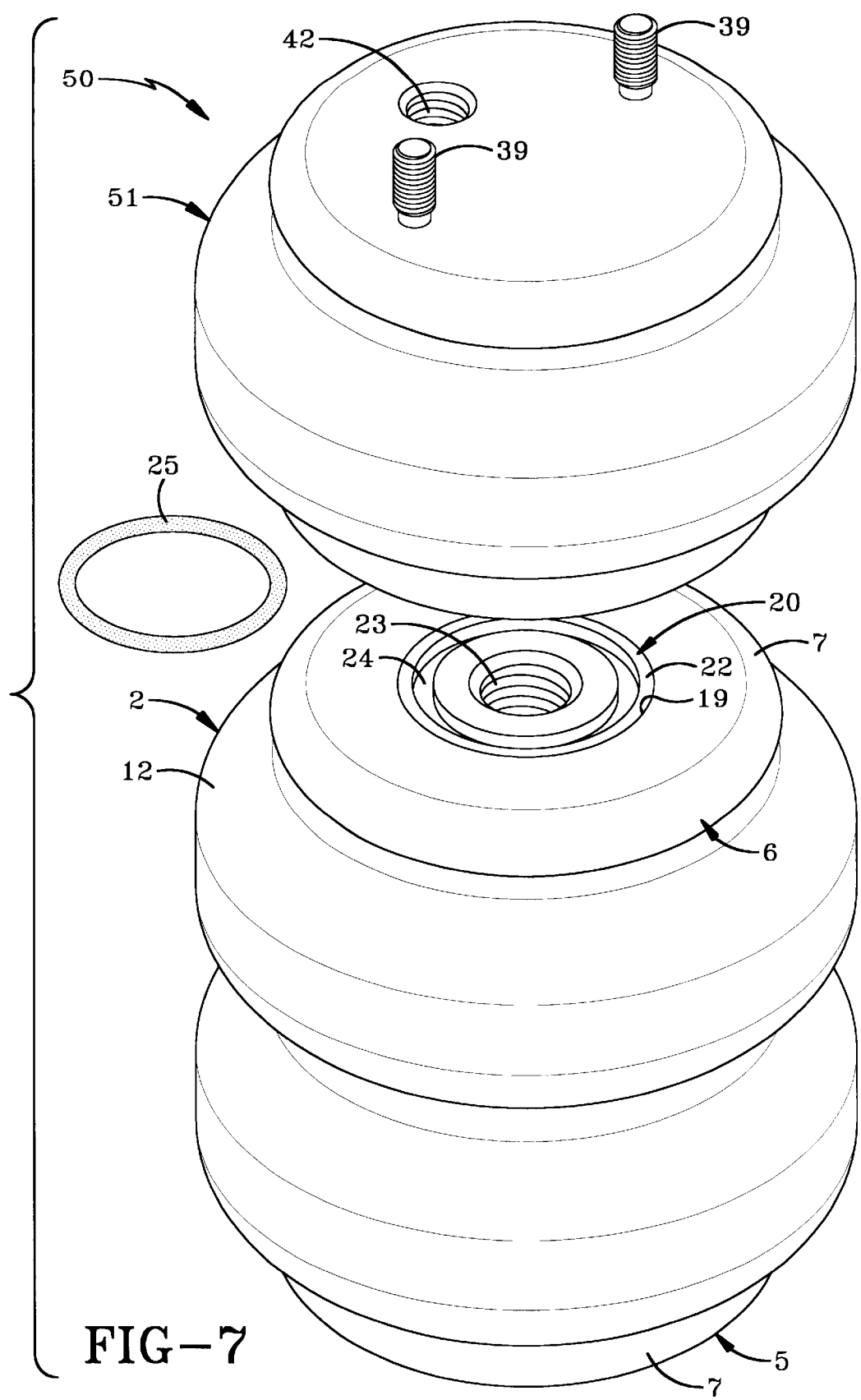
FIG. 7 is an exploded perspective view of a modified auxiliary reservoir and air spring assembly.
Figure 8:
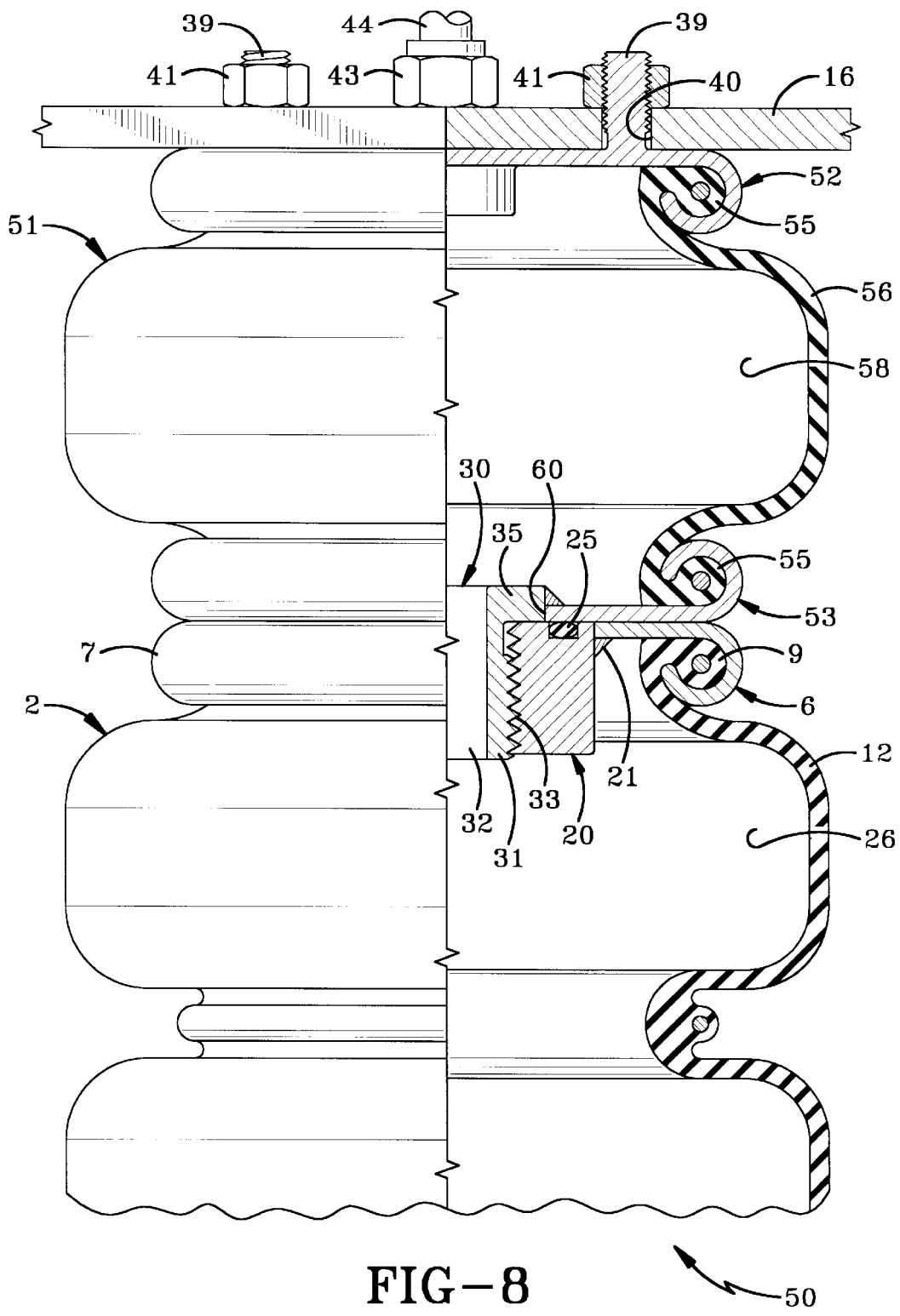
FIG. 8 is a fragmentary, partial sectional view, of the modified air spring assembly of FIG. 7.

A modified air spring assembly is indicated generally at 50, and is shown in FIGS. 7 and 8. Air spring assembly 50 includes air spring 2, as described above, and includes a modified auxiliary reservoir indicated generally at 51. Auxiliary reservoir 51 includes axially spaced top and bottom bead plates 52 and 53 which are sealingly connected to the bead areas 55 of an elastomeric sleeve 56 extending between the spaced bead plates and forming an internal fluid chamber 58. Bead plate 52 will have the above discussed threaded studs 39 and fluid inlet opening 42 formed therein, enabling air spring assembly 50 to be mounted on the usual mounting holes and bracket arrangements of vehicle support structure 16, again avoiding any modifications thereto.

Again, an externally threaded coupler 30 is secured by welds, brazing, etc. within an enlarged central opening 60 formed in bottom bead plate 53 for threaded engagement with insert 20 as discussed above. Again, O-ring 25 will provide the fluid seal when bead plate 53 is tightened into abutting engagement with end bead plate 6. Hollow bore 32 of coupler 30 provides the fluid path between auxiliary fluid chamber 58 and air spring chamber 26 to provide for the desired spring rate of air spring assembly 50. Again, by selecting the appropriate size of auxiliary reservoir 51, the spring rate of air spring assembly 50 can be adjusted easily to adapt assembly 50 to a particular suspension or shock absorbing requirement. Again, a standard bead plate can be utilized and requires only forming central opening 19 therein and the mounting of insert 20 therein for subsequently receiving coupler 30 which has been mounted in bottom bead plate 53 of auxiliary reservoir 51.

Thus the variable rate air spring assembly of the present invention utilizes existing air spring components and features, such as the end member, bead plate, or swage receiving end member for forming an airtight seal with the open end of the flexible sleeve, with the auxiliary reservoir being easily mounted to the modified bead plate or end member by a simple threaded connection. Furthermore, the opposite end of the auxiliary reservoir can have the particular mounting stud and fluid inlet opening arrangement as that previously formed on the bead plate, similar to end member 6, for securing the air spring assembly to vehicle component 16, avoiding any modification thereto. Likewise, existing air spring assembly equipment can be utilized for forming either the crimped seal with the open end of the flexible sleeve as shown in FIGS. 2 and 8, or with a swage ring type connected (not shown). Also, the fluid path existing between the air chambers formed by bore 32 is relatively short and can have various diameters to provide rapid movement of fluid between the two air chamber to achieve the desired spring rate, and reduce the number of possible fluid leak locations as in prior art auxiliary reservoir arrangements.

It is readily understood that the internally threaded or female component could be formed on the end member of the auxiliary reservoir and the externally threaded or male component could be formed on and extend outwardly from end member 6 without effecting the concept of the present invention.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of the invention is an example and the invention is not limited to the exact details shown or described.

What is claimed is:

1. A variable rate air spring assembly comprising:
   an air spring having first and second spaced end members and a flexible sleeve extending therebetween and forming an internal fluid chamber, said sleeve having a pair of opposed ends at least one of which is open;
   said first end member being an end plate sealingly connected to the open end of the sleeve to provide an airtight seal therewith;
   said end plate being formed with an internally threaded centrally located hole;
   an auxiliary reservoir including first and second spaced end members and an internal auxiliary fluid chamber, said first end member of the auxiliary reservoir having a central opening and an externally threaded coupler having a hollow bore extending from said central opening; and
   said externally threaded coupler being threadably received in the internally threaded hole of the end plate to rotatably mount the auxiliary reservoir on the end plate of the air spring, with the first end member of the auxiliary reservoir being in an abutting relationship with said end plate of the air spring, and with the hollow bore of the externally threaded coupler being in fluid communication with the central hole of the end plate to provide a fluid path between the internal fluid chamber of the air spring and the auxiliary fluid chamber of the auxiliary reservoir.

2. The air spring assembly defined in claim 1 wherein the auxiliary reservoir further includes a flexible sleeve extending between and sealingly connected to the spaced end members of said auxiliary reservoir and forming the auxiliary fluid reservoir therebetween.

3. The air spring assembly defined in claim 2 wherein the second end member of the auxiliary reservoir includes fasteners for securing the air spring assembly to a support structure, and a fluid inlet opening for supplying fluid into the fluid chamber of the auxiliary reservoir and connected fluid chamber of the air spring.

4. The air spring assembly defined in claim 3 wherein the first end member of the auxiliary reservoir is sealingly connected to the flexible sleeve of the auxiliary reservoir by a crimped end.

5. The air spring assembly defined in claim 1 wherein the auxiliary reservoir is a rigid canister formed by the first and second end members and an intervening rigid sidewall.

6. The air spring assembly defined in claim 1 wherein the internally threaded hole of the end plate of the air spring is formed in an insert; and in which said insert is mounted within an enlarged opening formed in the center of the end plate.

7. The air spring assembly defined in claim 6 wherein the insert is an annular member which projects from the end plate into the fluid chamber of the air spring.

8. The air spring assembly defined in claim 6 wherein the insert is formed with an annular groove; and in which a sealing ring is seated in said groove.

9. The air spring assembly defined in claim 6 wherein the insert is secured in the central opening by a weld.

10. The air spring assembly defined in claim 1 wherein a central opening is formed in the first end member of the auxiliary reservoir; and in which the coupler is secured in and extends through said central opening.

11. The air spring assembly defined in claim 10 wherein the coupler is T-shape in cross section with an upstanding leg and a cross member; in which the upstanding leg is formed with the external threads; and in which the cross member is circular and is secured in the central opening of the auxiliary reservoir first end member.

12. The air spring assembly defined in claim 1 wherein the end plate of the air spring is a disc-shaped bead plate having an outer edge; and in which said outer edge is crimped to the open end of the flexible sleeve to provide the airtight seal therewith.

13. The air spring assembly defined in claim 1 wherein an annular groove surrounds the internally threaded hole; and in which a sealing ring is seated in said groove.

14. A system for providing an air spring assembly with a variable spring rate comprising:

an air spring having first and second spaced end members and a flexible sleeve extending therebetween and forming an internal fluid chamber, said sleeve having a pair of opposed ends at least one of which is open;

said first end member being an end plate sealingly connected to the open end of the sleeve to provide an airtight seal therewith, said end plate having a first component of a threaded connection centrally mounted on said end plate and formed with an opening;

an auxiliary reservoir mounted on said end plate of the air spring, said reservoir including first and second spaced end members and an internal auxiliary fluid chamber, said first end member of the auxiliary reservoir having a second component of the threaded connection centrally mounted thereon and formed with an opening; and said auxiliary reservoir being rotatably threadedly mounted on the end plate of the air spring by the threaded connection with the openings formed in the end plate of the air spring and end member of the auxiliary reservoir being in fluid communication to provide a fluid path between the internal fluid chamber of the air spring and the auxiliary fluid chamber of the auxiliary reservoir.

15. The system defined in claim 14 wherein the auxiliary reservoir further includes a flexible sleeve extending between and sealingly connected to the spaced end members and forming the auxiliary fluid chamber therebetween.

16. The system defined in claim 14 wherein the second end member of the auxiliary reservoir includes fasteners for securing the auxiliary reservoir to a support structure, and a fluid inlet opening for supplying fluid into the fluid chamber of the auxiliary reservoir and connected fluid chamber of the air spring.

17. The system defined in claim 14 wherein the auxiliary reservoir is a rigid canister formed by the first and second end members and an intervening rigid sidewall.

18. The system defined in claim 14 wherein the opening formed in the end plate of the air spring is an internally threaded hole formed in an insert; and in which said insert is mounted within an enlarged opening formed in the central opening of said end plate.

19. The system defined in claim 17 wherein the insert is an annular member which projects from the end plate into the fluid chamber of the air spring.

20. The system defined in claim 17 wherein the insert is formed with an annular groove; and in which a sealing ring is adapted to be seated in said groove.

21. The system defined in claim 14 wherein the end plate is a bead plate having an outer edge; and in which said outer edge is crimped to the open end of the flexible sleeve to provide the airtight seal therewith.

22. A method of providing an air spring with an auxiliary reservoir having an auxiliary air chamber to change the spring rate of the air spring wherein the air spring has, a pair of spaced end members and a flexible sleeve extending therebetween and forming an internal fluid chamber, wherein one of the end members of the air spring is an end plate, said method includes the steps of:

forming a central opening in the end plate;

mounting an insert having an internally threaded hole in said central opening;

providing the auxiliary reservoir with an externally threaded hollow coupler extending outwardly from an end wall of said reservoir; and rotatable mounting the auxiliary reservoir into an abutting relationship with the end plate of the air spring by rotatably threadedly connecting the coupler of the auxiliary reservoir within the internally threaded hole of the insert of the air spring.

23. The method defined in claim 22 including the steps of forming an annular groove in the insert concentrically about the internally threaded hole; and placing a flexible seal in said groove.

* * * * *